No. 706,483. Patented Aug. 5, 1902.
H. A. WISE.
RUNNING GEAR FOR VEHICLES.
(Application filed Oct. 17, 1901.)
(No Model.) 2 Sheets—Sheet 1.
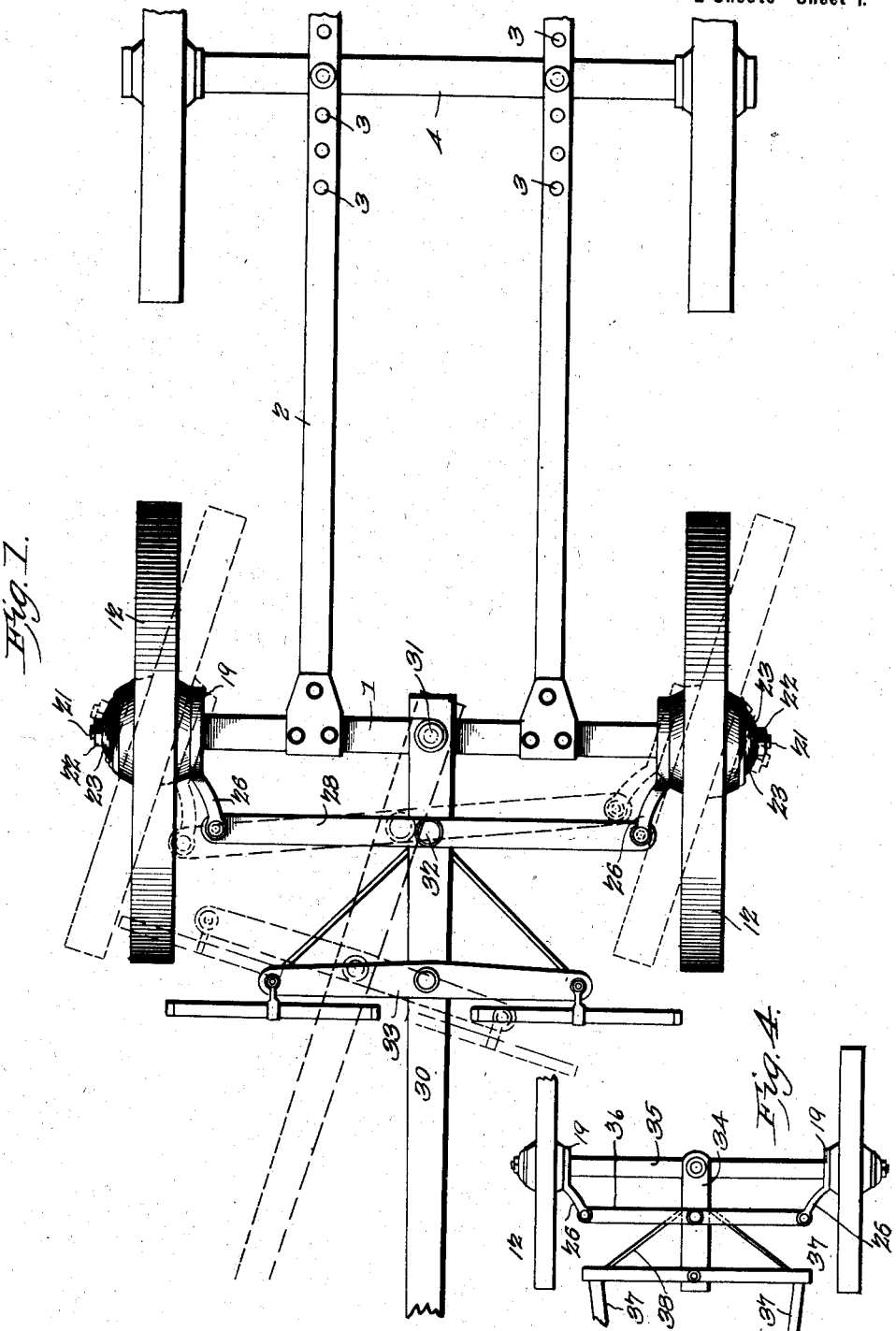

No. 706,483. Patented Aug. 5, 1902.
H. A. WISE.
RUNNING GEAR FOR VEHICLES.
(Application filed Oct. 17, 1901.)
(No Model.) 2 Sheets—Sheet 2.
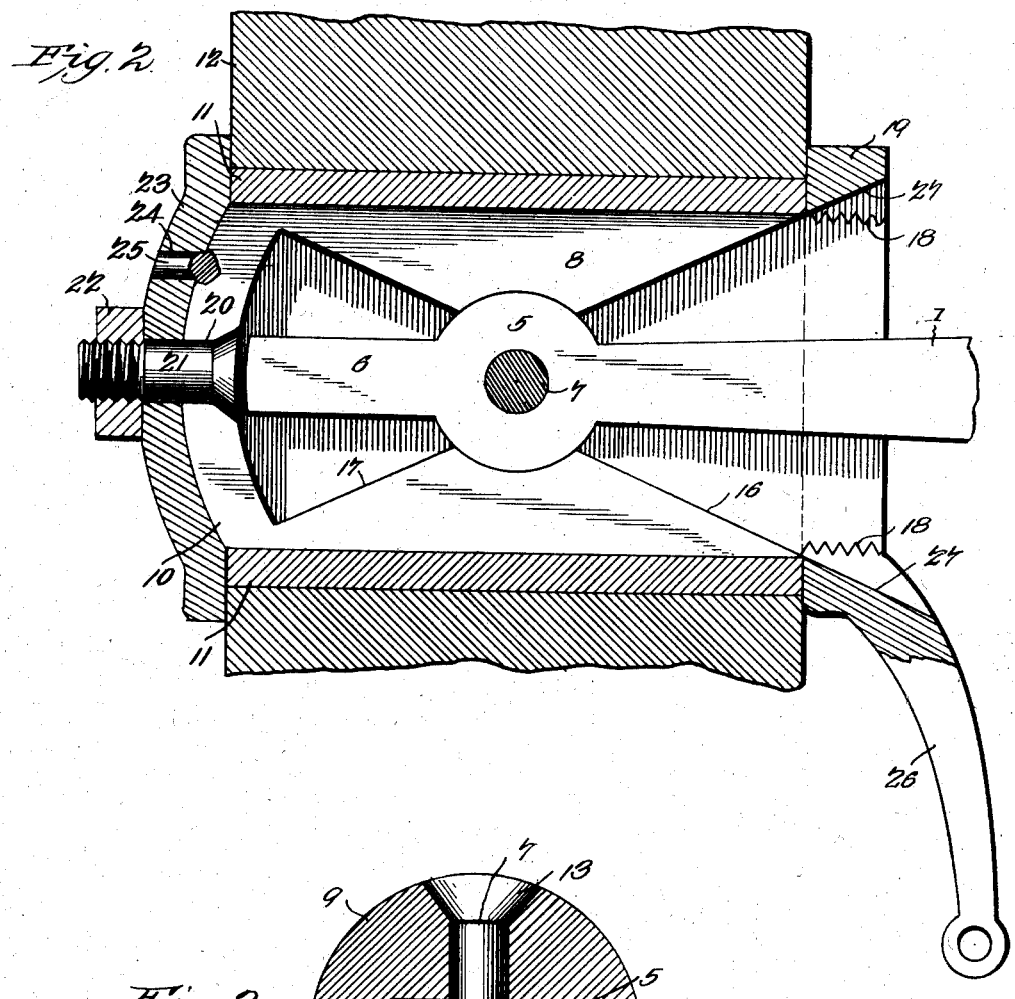
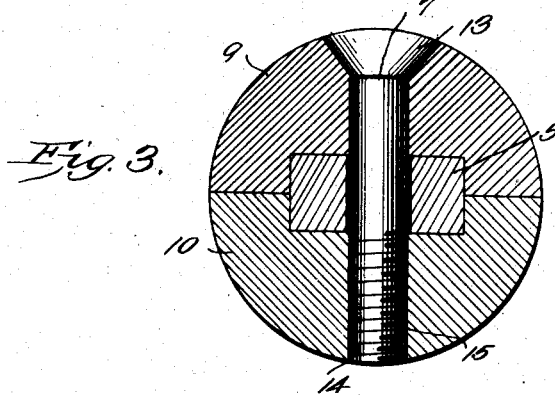

UNITED STATES PATENT OFFICE.

HERBERT A. WISE, OF LUXORA, ARKANSAS.

RUNNING-GEAR FOR VEHICLES.

SPECIFICATION forming part of Letters Patent No. 706,483, dated August 5, 1902.

Application filed October 17, 1901. Serial No. 78,995. (No model.)

*To all whom it may concern:*

Be it known that I, HERBERT A. WISE, a citizen of the United States, residing at Luxora, in the county of Mississippi and State of Arkansas, have invented a new and useful Running-Gear for Vehicles, of which the following is a specification.

The invention relates to improvements in running-gear for vehicles.

The object of the present invention is to improve the construction of running-gear for wagons, carriages, automobiles, and various other vehicles and to provide a simple and comparatively inexpensive one adapted to enable a vehicle to be readily guided and capable, when applied to a wagon, carriage, or analogous vehicle, of preventing the tongue or pole from jerking and whipping against the draft-animals when a wheel strikes an obstruction.

A further object of the invention is to provide a running-gear in which the pivots of the front wheels will be located immediately in rear of the rims of the same, whereby when the wheels come in contact with an obstruction the latter will not operate to swing laterally and the momentum of the vehicle will assist in causing the wheel to ride over the obstruction.

The invention consists in the construction and novel combination and arrangement of parts hereinafter fully described, illustrated in the accompanying drawings, and pointed out in the claims hereto appended.

In the drawings, Figure 1 is a plan view of a running-gear constructed in accordance with this invention. Fig. 2 is a horizontal sectional view of one of the spindles. Fig. 3 is a sectional view taken transversely thereof. Fig. 4 is a detail view illustrating the manner of connecting a pair of thills to the running-gear.

Like numerals of reference designate corresponding parts in all the figures of the drawings.

1 designates a front axle rigidly secured to the front ends of a pair of reaches 2, and the latter are provided at their rear portions with perforations 3, arranged at intervals and adapted to receive suitable fastening devices for adjustably securing the reaches to a rear axle 4. The rear axle is designed to receive the ordinary bolster, and the front axle is designed to be provided with a sand-board or bolster of the ordinary construction and with the usual upper or rocking bolster. This portion of the running-gear may be constructed in any desired manner, as the improvements herein shown and described are applicable to all kinds of road-vehicles—such as wagons, carriages, automobiles, and the like.

The front axle is provided at each end with a circular eye 5, and it has a short arm or extension 6, located beyond the eye, which is circular and which is provided with a circular opening for the reception of a screw 7, which forms a pivot for connecting a spindle 8 to the front axle. The spindle 8 is composed of upper and lower sections 9 and 10, which are approximately semicylindrical and which fit within a cylindrical axle-box 11 of a wheel 12. The screw 7, which forms the said pivot, is arranged centrally of the spindle, and it is provided at its upper end with a countersunk head 13, having its outer face flush with the adjacent surface of the upper section 9. The lower end 14 of the pivot-bolt is threaded and engages a threaded opening 15 of the lower section 10 of the spindle. The bolt 7 performs the double function of serving as a pivot and of securing the upper and lower sections of the spindle together. The sections are provided with longitudinal openings for the reception of the end of the axle, and the openings are provided with inner and outer tapered portions 16 and 17, which gradually decrease in width toward the center, where the openings are circular to form a bearing for the circular eye 5. The tapered inner and outer portions of the openings of the sections of the spindle permit the necessary pivotal movement of the wheel, the arm 6 being located in the outer portions of the tapered openings and the adjacent portion of the axle being located in the inner portions of the openings, as clearly illustrated in Fig. 2 of the accompanying drawings.

The inner ends of the semicylindrical sections of the spindle are threaded, and these inner threaded ends 18 are engaged by a ring 19, which is interiorly threaded and which extends beyond the sections to form a collar for the spindle. The hub of the wheel fits against the collar or ring 19, which assists in securing the sections together.

The outer ends of the sections are provided with central registering grooves or recesses 20, receiving and forming an opening for the head and adjacent portion of a screw 21, which extends horizontally from the spindle and which is adapted to receive the axle-nut 22. The horizontally-projecting screw 21, which is interlocked with the sections of the spindle, receives a washer or disk 23, which engages the outer end of the hub of the wheel to retain the latter on the spindle. The washer or plate is provided with an eccentric perforation 24, which receives a projection or pin 25, extending from one of the sections of the spindle and adapted to prevent the washer or plate from rotating. The washer or plate is held stationary and rigid with the spindle, and the axle-nut 22, which engages the outer face of the disk or washer, will not require any locking mechanism, as there is no tendency for the nut to unscrew.

The rings or collars 19 are provided with forwardly-extending arms 26, and they have opposite grooves 27, adapted to register with the openings of the sections, as illustrated in Fig. 2, to provide the necessary play for the wheels.

The forwardly-extending arms are connected by a cross-bar 28, to which is pivoted a tongue or pole 30, which operates as a lever and which is fulcrumed at its rear end on the front axle by a suitable pivot 31. The pivot 32 of the connecting-bar 28 passes through the said bar and through the tongue or pole, which is provided with a doubletree 33 and with singletrees, and when the tongue or pole is swung laterally the wheels will be turned laterally on the pivot-bolts 7. The doubletree is supported by suitable braces, and as the tongue or pole operates as a lever the wheels may be readily swung laterally to guide the vehicle. When the improvements are applied to an automobile, any construction of steering-lever may be provided for moving the transverse connecting-bar 29. The construction shown in Fig. 1 does away with the front hound, and the front axle is rigidly secured to the sand-board or bolster. (Not shown.)

When a pair of shafts or thills is employed, a short lever or bar 34 is pivoted at its rear end to the axle 35 and is similarly connected between its ends to the transverse connecting-bar 36. The shafts or thills 37 are mounted on the short bar or lever and are supported by suitable braces 38.

It will be seen that the vertical pivot-bolts 7, which are arranged centrally of the spindles, are also located centrally of the treads or rims of the wheels, so that when a wheel strikes an obstruction there will be no liability of the wheel to turn or twist laterally, and the momentum or headway of the vehicle will operate to force the wheel over the obstruction. It will also be apparent that by arranging the pivots centrally of the spindles the jerking or whipping action of the tongue or pole is prevented and vehicles are enabled to run much smoother than is possible when the pivots are arranged at any other point.

The construction of the spindle is also adapted for mounting a single wheel, as the axle may be supported at each side of the wheel, and the improvements may be applied to three-wheeled vehicles by mounting one of the wheels in this manner.

What is claimed is—

1. In a device of the class described, the combination with an axle, of a spindle composed of two sections and provided with a pivot passing through the axle and connecting the sections, substantially as described.

2. In a device of the class described, the combination of a spindle composed of two sections provided with longitudinal openings having inner and outer tapered portions converging toward the center, a central pivot carried by the spindle, and an axle extending into the said openings and provided with an eye to receive the pivot, and having the arm or extension 6 extending into the outer tapered portions of the openings, substantially as described.

3. In a device of the class described, the combination with an axle, of a spindle composed of sections and receiving the axle, and a pivot carried by the spindle and connecting the same with the axle, substantially as described.

4. In a device of the class described, the combination of a spindle composed of sections, a collar or ring arranged at the inner ends of the sections and receiving the same and securing the sections together and adapted to abut against a hub, and a pivot carried by the spindle for connecting it to an axle, substantially as described.

5. In a device of the class described, the combination of a spindle composed of sections having longitudinal openings composed of circular central portions, and inner and outer tapered portions, an axle arranged within the spindle and having an eye located near its end and arranged within the central portions of the openings of the sections, and a pivot passing through the eye and connecting the sections, substantially as described.

6. The combination of an axle, a spindle composed of two sections receiving the axle and provided at their outer ends with registering grooves or notches, a pivot carried by the spindle and passing through the axle, and a screw having its head arranged within the grooves or notches, whereby it is detachably interlocked with the spindle, said screw extending outward from the spindle and adapted to receive an axle-nut, substantially as described.

7. In a device of the class described, the combination of a spindle composed of separable sections, a screw interlocked with and extending outward from the sections, an axle-nut arranged on the screw, a washer mounted on the screw and having a perforation, and a projection carried by the spindle and engaging the perforation of the washer, substantially as described.

8. The combination of an axle, a spindle composed of two sections receiving the axle, a pivot carried by the spindle and connecting the latter to the axle, a longitudinally-disposed fastening device extending outward from the outer end of the spindle and detachably interlocked with the sections and adapted to receive means for holding a wheel on the spindle, and means for connecting the sections, substantially as described.

In testimony that I claim the foregoing as my own I have hereto affixed my signature in the presence of two witnesses.

HERBERT A. WISE.

Witnesses:
O. S. EMERSON,
H. W. SPAIN.